Figure 11:
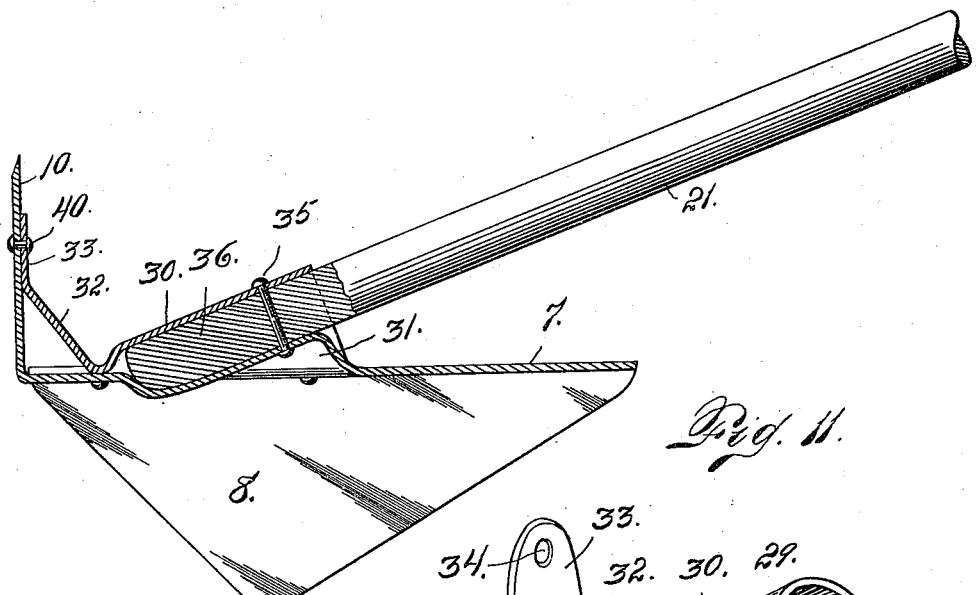

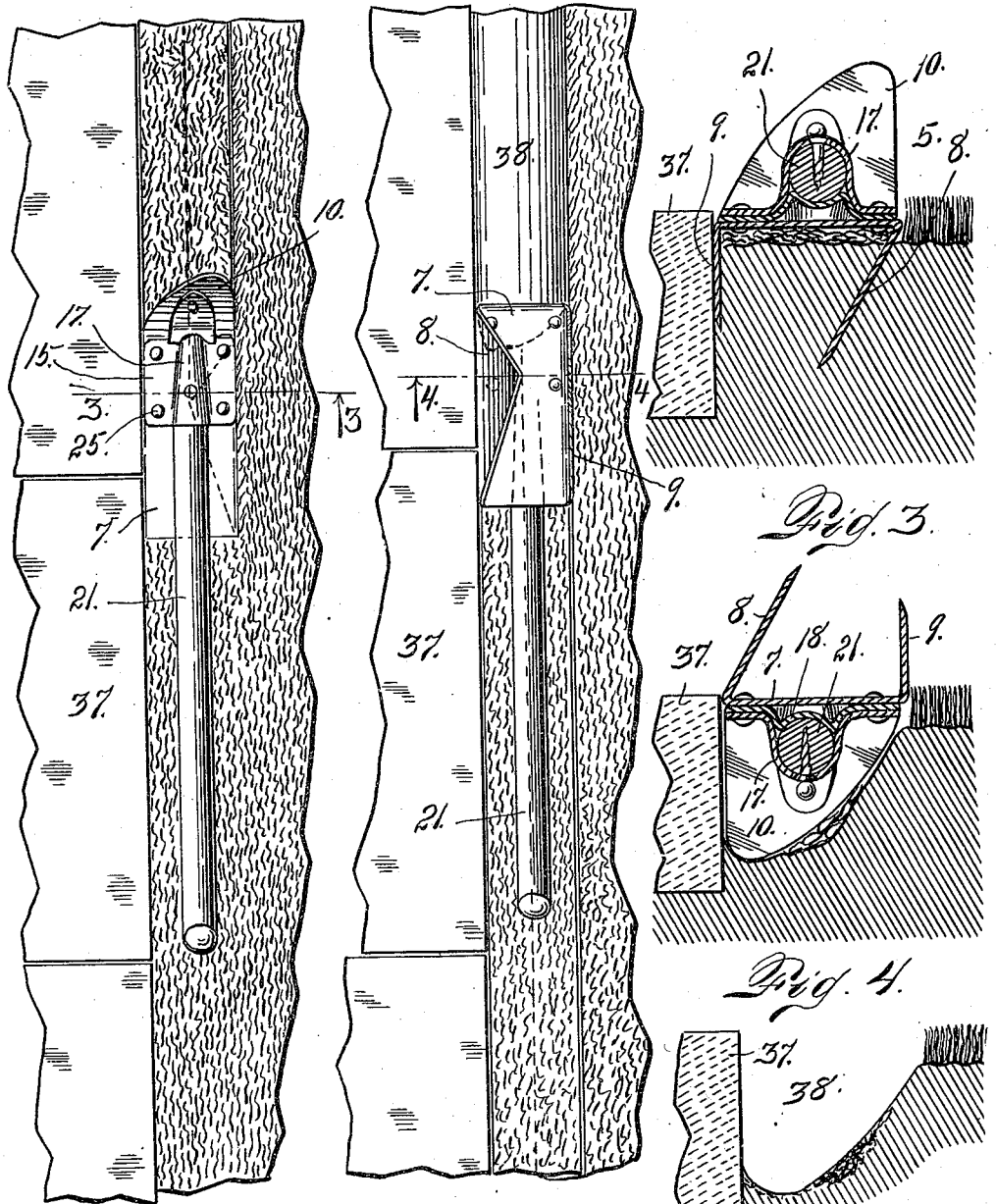

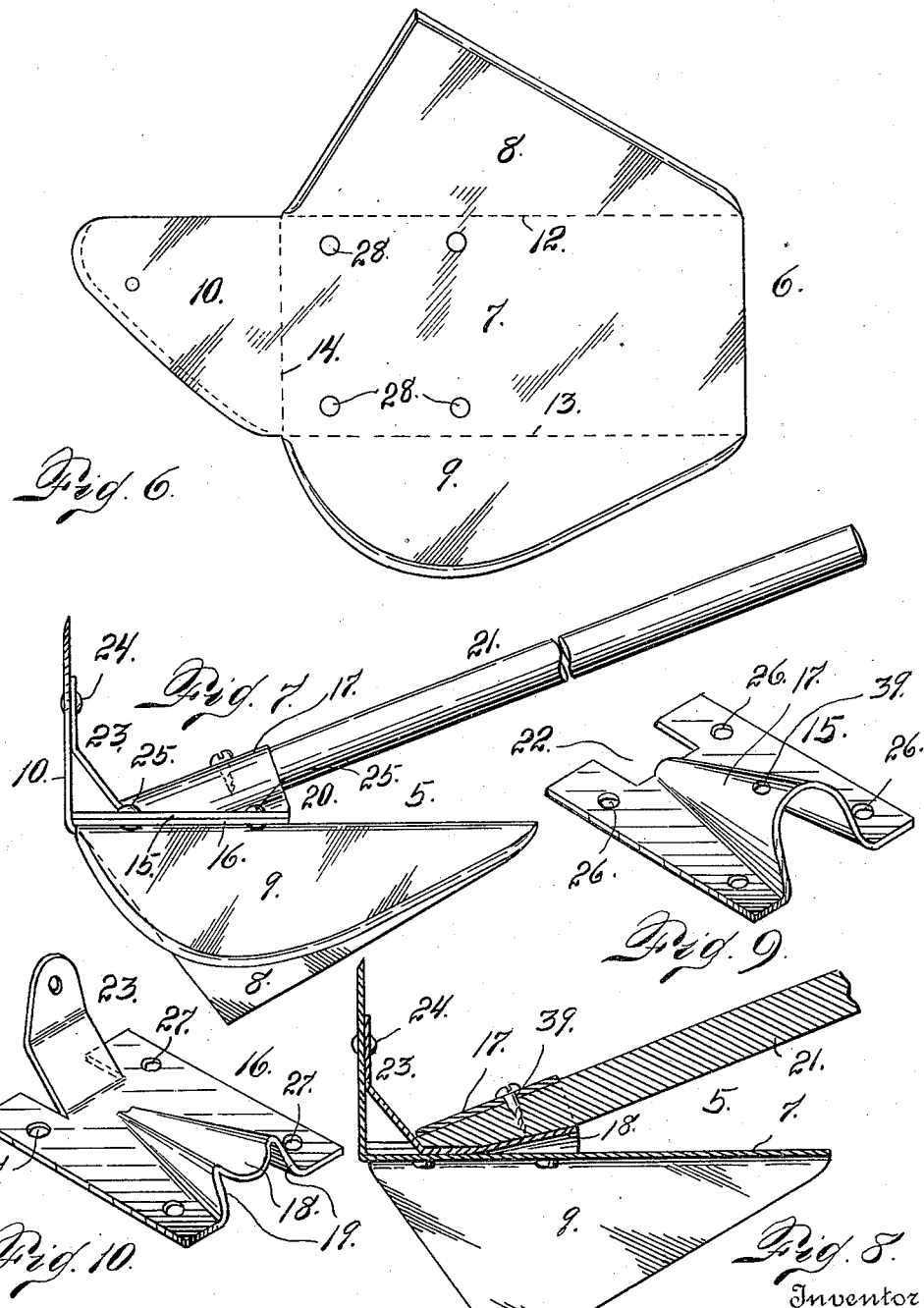

UNITED STATES PATENT OFFICE.

PETER IMHOF AND WILLIAM J. KELLY, OF DENVER, COLORADO.

LAWN-EDGER.

1,139,978.  Specification of Letters Patent.  Patented May 18, 1915.

Application filed June 29, 1914. Serial No. 847,876.

*To all whom it may concern:*

Be it known that we, PETER IMHOF and WILLIAM J. KELLY, citizens of the United States, residing in the city and county of Denver and State of Colorado, have invented certain new and useful Improvements in Lawn-Edgers; and we do declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to improvements in lawn edgers, or devices for giving a finished appearance to the edge of the lawn adjacent walks, and whereby a trench or earth groove approximately V-shaped in cross section, is produced. Heretofore, so far as we are aware, the only instrument used in connection with this work is the ordinary spade, making the work very expensive because of the great amount of time required by the gardener in properly accomplishing it.

The object of our invention is not only to facilitate the work, but also to provide a device whereby the work may be better accomplished, as the edge may be made perfectly straight, while the walls of the trench or earth groove are made uniform and symmetrical; and to this end, the invention consists of a tool comprising a handle and a head member, the head consisting of two blades, one of which is vertically disposed when in use, while the other is inclined to the vertical and extends inwardly toward the vertical blade, the two blades being suitably spaced to form an earth groove or trench having a vertical wall and an inclined wall, the vertical wall being adjacent the walk and the inclined wall adjacent the lawn or on the lawn side of the groove or trench. These two blades are connected at the top by a plate which is upturned at one edge to form an angle shaped member which may be employed for cleaning out the trench after the work of the two blades has been accomplished. The handle is connected with the head in any suitable manner.

As illustrated in the drawing, the head of the device with the exception of a part forming a socket for the handle, is formed from an integral piece of sheet metal which may be stamped into the proper shape, as heretofore outlined, after which the socket part is applied and the handle connected therewith in any suitable manner.

Having briefly outlined our improvement, we will proceed to describe the same in detail, reference being made to the accompanying drawing, in which is illustrated an embodiment thereof.

Figure 12:
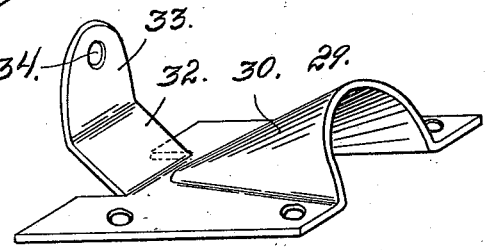
Figure 13:
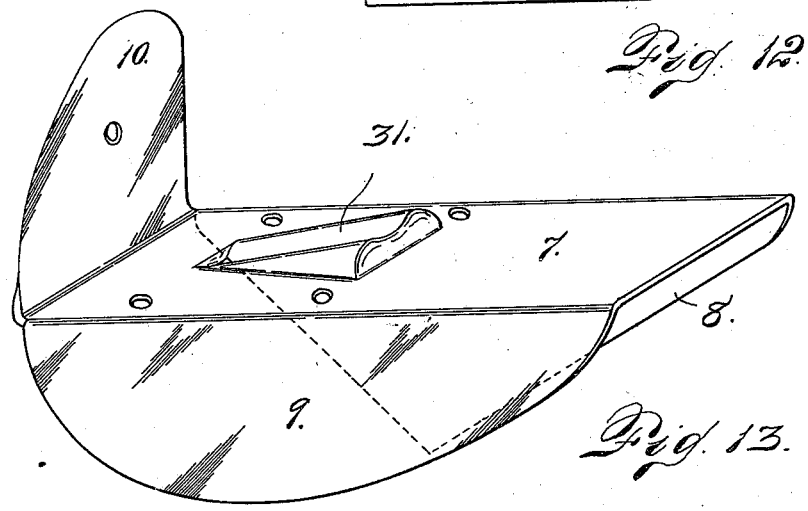

In this drawing, Figure 1 is a top plan fragmentary view illustrating a walk and an adjacent lawn, showing our improved device in position for use while forming a trench or earth groove adjacent the walk. Fig. 2 is a similar view showing the tool in the reversed position, and as employed for cleaning out the earth groove after the cutting operation has been accomplished. Fig. 3 is a cross section taken on the line 3—3, Fig. 1. Fig. 4 is a similar section taken on the line 4—4, Fig. 2. Fig. 5 is a cross section taken through the groove and also cutting the walk and the adjacent part of the lawn. Fig. 6 is a top plan view of the blank from which the body portion of the head of the device is formed, the same being shown on a larger scale than in the previous views. Fig. 7 is a side elevation of the tool, with the handle partly broken away, shown on approximately the same scale as Fig. 6. Fig. 8 is a section taken through the tool, on a plane cutting the handle and its socket longitudinally. Fig. 9 is a perspective view of a socket plate employed in connection with the body of the head. Fig. 10 is a coöperating socket plate. Fig. 11 is a section similar to Fig. 8, but showing a slightly modified form of construction so far as the socket of the device is concerned. Fig. 12 is a perspective view of the socket plate employed in connection with the form of construction shown in Fig. 11. Fig. 13 is a detail view in perspective of the body of the head of the device of the form shown in Fig. 11. Figs. 11, 12 and 13 are shown on a slightly larger scale than the other views.

The same reference characters indicate the same parts in all the views.

Referring first to Figs. 1 to 10, inclusive, of the drawing, let the numeral 5 designate the head of our improved device, which is formed from a blank 6 composed of sheet metal and comprising a top plate 7, cutting blades 8 and 9, and a cleaning member 10. In forming the head of the device from this blank, the metal is bent on the dotted line 12, whereby the blade 8 is inclined inwardly, as it extends downwardly; and on the dotted line 13, whereby the blade 9 occupies a vertical position; while the plate is bent on the dotted line 14 whereby the member 10 extends upwardly above the top plate 7 or in a direction opposite the projection of the blades 8 and 9. To the upper surface of the top plate 7 is secured two upper and lower socket members 15 and 16, the upper socket member having an upwardly bent socket part 17, which coöperates with a socket part 18 formed in the member 16, the metal of which is first bent upwardly as shown at 19, and then downwardly, whereby the entire socket 20 which is adapted to receive the lower extremity of the handle 21, occupies a position above the top plate 7 of the device. As illustrated in the drawing, the member 15 is recessed at one extremity as shown at 22, to allow a brace 23, with which the member 16 is provided, to extend upwardly therethrough. This brace is riveted to the member 10 of the device, as shown at 24, while the members 16 and 17 are secured to the top plate 7 by passing rivets 25 or other suitable fastening devices, through registering openings 26, 27 and 28, formed in the members 15 and 16, and in the top plate 7. After the lower extremity of the handle has been inserted in the socket composed of two parts 17 and 18, a screw may be passed through an opening 28 formed in the socket part 17, and threaded into the socket extremity of the handle.

In the form of construction shown in Figs. 11 to 13, inclusive, a single socket plate 29 is employed, and the socket part 30 coöperates with a socket part 31, struck up out of the top plate 7 of the head of the device. In this event, the member 29 is provided with a brace 32 and a securing lip 33, perforated as shown at 34 to receive a rivet 40 or other suitable fastening member. It is believed that this form of the device will be somewhat more economical to manufacture than the other form. As illustrated in Fig. 11, a pin 35 is passed through registering openings formed in the socket members 29 and 31, and in the part 36 of the handle, which enters the socket.

From the foregoing description, the use and operation of our improvement will be readily understood. Both forms of the device are used in the same manner. In the first place, the tool is used as illustrated in Fig. 1. The two blades 8 and 9 extending downwardly, the vertical blade 9 being adjacent the wall 37 of the inclined blade 10 on the lawn side thereof. Assuming that the device is placed in this position, (see Figs. 1 and 3) the user draws the head of the tool along so that the blade 9 is guided by the edge of the walk, until the cutting operation has been completed for a suitable distance. The position of the head will then be reversed (see Fig. 3), and the member 10 employed for cleaning out the trench, whose walls have been formed by the blades 8 and 9. This blade 10 has the shape approximately of the cross section of the groove 38.

From the foregoing description, it will be understood that the lawn edging function may be economically accomplished by our improved device, while at the same time, a much better job can be obtained than by the method and tools heretofore in vogue.

Having thus described our invention, what we claim is,—

1. A lawn edger comprising a top plate having downwardly extending spaced blades arranged on opposite sides, and an upwardly extending blade located at one end of the plate.

2. A lawn edger comprising a top plate having downwardly extending spaced blades arranged on opposite sides, and an upwardly extending blade located at one end of the plate, the shape of the upwardly bent blade conforming approximately with the cross sectional area of the space between the two downwardly bent blades.

3. A lawn edger comprising a top plate having downwardly bent side blades arranged in opposing relation and suitably spaced, one of said blades being inclined to the vertical and extending toward the other blade, and an upwardly extending blade located at one end of the plate and having one vertical edge and another edge inclined to the vertical to conform approximately to the inclination of the inclined side blade.

4. A lawn edger comprising a top plate having side blades extending therefrom in one direction, an end blade extending therefrom in the opposite direction, and a socket plate applied to the top plate.

5. A lawn edger comprising a top plate having side blades extending therefrom in one direction, an end blade extending therefrom in the opposite direction, and a socket plate applied to the top plate, and having an upwardly projecting brace secured to the end blade, substantially as described.

In testimony whereof we affix our signatures in presence of two witnesses.

PETER IMHOF.
WILLIAM J. KELLY.

Witnesses:
 MAZE KIRBY,
 A. ELBERT O'BRIEN.

Copies of this patent may be obtained for five cents each, by addressing the "Commissioner of Patents, Washington, D. C."